(12) United States Patent
Yeh et al.

(10) Patent No.: US 12,049,403 B2
(45) Date of Patent: Jul. 30, 2024

(54) GRAPHENE OXIDE DOUGHS

(71) Applicant: Northwestern University, Evanston, IL (US)

(72) Inventors: Che-Ning Yeh, Union City, CA (US); Jiaxing Huang, Wilmette, IL (US)

(73) Assignee: Northwestern University, Evanston, IL (US)

( * ) Notice: Subject to any disclaimer, the term of this patent is extended or adjusted under 35 U.S.C. 154(b) by 520 days.

(21) Appl. No.: 17/274,889

(22) PCT Filed: Sep. 13, 2019

(86) PCT No.: PCT/US2019/050927
§ 371 (c)(1),
(2) Date: Mar. 10, 2021

(87) PCT Pub. No.: WO2020/056212
PCT Pub. Date: Mar. 19, 2020

(65) Prior Publication Data
US 2022/0081303 A1    Mar. 17, 2022

Related U.S. Application Data

(60) Provisional application No. 62/730,848, filed on Sep. 13, 2018.

(51) Int. Cl.
*C01B 32/198* (2017.01)

(52) U.S. Cl.
CPC ........ *C01B 32/198* (2017.08); *C01P 2006/82* (2013.01); *C01P 2006/90* (2013.01)

(58) Field of Classification Search
CPC ... C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23

See application file for complete search history.

(56) References Cited

U.S. PATENT DOCUMENTS

2018/0134902 A1    5/2018  Wu et al.

FOREIGN PATENT DOCUMENTS

WO    WO 2019/040564    2/2019

OTHER PUBLICATIONS

Parviz, et al., Tailored Network Formation in Graphene Oxide Gels, Langmuir 2018; 34: 8550-8559 (Year: 2018).*

(Continued)

*Primary Examiner* — Daniel C. McCracken
(74) *Attorney, Agent, or Firm* — Bell & Manning, LLC

(57) ABSTRACT

Graphene oxide doughs are provided. Also provided are dense, glassy solids made from the doughs and methods of making the doughs and the solids. The doughs and solids have high graphene oxide or reduced graphene oxide contents, and the sheets in the doughs and solids lack long-range lamellar stacking order.

8 Claims, 10 Drawing Sheets

(56) References Cited

OTHER PUBLICATIONS

Li, et al., "Pottery" of Porous Graphene Materials, Adv. Electron. Mater. 2015; 1: 1500004, pp. 1-7 (Year: 2015).*

The International Search Report and the Written Opinion dated Dec. 5, 2019 for International Patent Application No. PCT/US19/50927; pp. 1-7.

L. Dong et al., "A non-dispersion strategy for large-scale production of ultra-high concentration graphene slurries in water," *Nat. Commun.*, Jan. 8, 2018, vol. 9, No. 76; pp. 1-8. Doi:10.1038/s41467-017-02580-3.

YH Shim et al., "Wide concentration liquid crystallinity of graphene oxide aqueous suspensions with interacting polymers," *Mater. Horiz.*, Sep. 25, 2017, vol. 4; DOI10.1039/C7MH00624A.

S. Lin et al., "Synthetic Multifunctional Graphene Composites with Reshaping and Self-Healing Features via a Facile Biomineralization-Inspired Process," *Adv. Mater.*, Jul. 3, 2018, vol. 30, No. 34.; https://doi.org/10.1002/adma.201803004.

Y. Jiang et al., "Versatile Graphene Oxide Putty-Like Material," *Adv. Mater.*, Oct. 5, 2016, vol. 28, No. 46. https://doi.org/10.1002/adma.201603284.

C. Yeh et al., "Binder-free graphene oxide doughs," *Nat. Commun.*, Jan. 24, 2019, vol. 10, No. 422; pp. 1-11.

Chi Cheng et al., "Solvated Graphenes: An Emerging Class of Functional Soft Materials," *Adv. Mater.* 2013, vol. 25, pp. 13-30. DOI: 10.1002/adma.201203567.

Jaemyung Kim et al., "Two Dimensional Soft Material: New Faces of Graphene Oxide," *Accounts of Chemical Research* 2012, vol. 45, No. 8, pp. 1356-1364.

Dmitriy A. Dikin et al., "Preparation and characterization of graphene oxide paper," *Nature* Jul. 26, 2007, vol. 448; pp. 457-460.

Virendra Singh et al., "Graphene based materials: Past, present and future," *Progress in Materials Science* 2011, vol. 56, pp. 1178-1271.

Ling Qiu et al., "Biomimetic superelastic graphene-based cellular monoliths," *Nature Communications*, 3:1241, pp. 1-7; DOI: 10.1038/ncomms2251.

Cheng Zhu et al., "Highly compressible 3D periodic graphene aerogel microlattices," *Nature Communications*, 6:6962, pp. 1-8. DOI: 10.1038/ncomms7962.

Kevin Chiou et al., "Additive-free carbon nanotube dispersions, pastes, gels, and doughs in cresols," *PNAS* May 29, 2018, vol. 115, No. 22; 5703-5708.

Yingru Li et al., Supporting Information—""Pottery" of Porous Graphene Materials," Adv. Electron. Mater., DOI: 10.1002/Aelm.201500004.

Chong Luo et al., "A Cut-and-Paste Approach to 3D Graphene-Oxide-Based Architectures," *Advanced Materials* 30.15 (2018): 1706229.

Yingru Li et al., "Pottery" of Porous Graphene Materials, *Advanced Electronic Materials* 2015, 1, 1500004 (1 of 7).

* cited by examiner

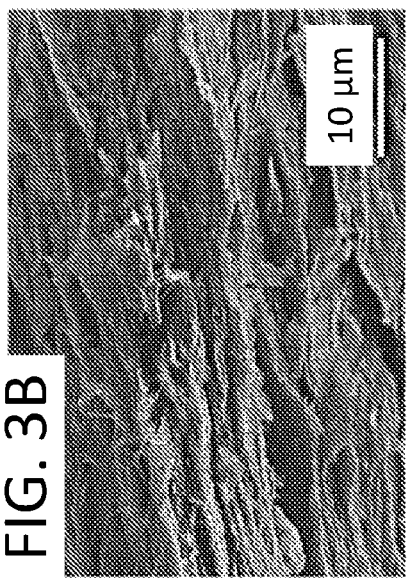
FIG. 3B
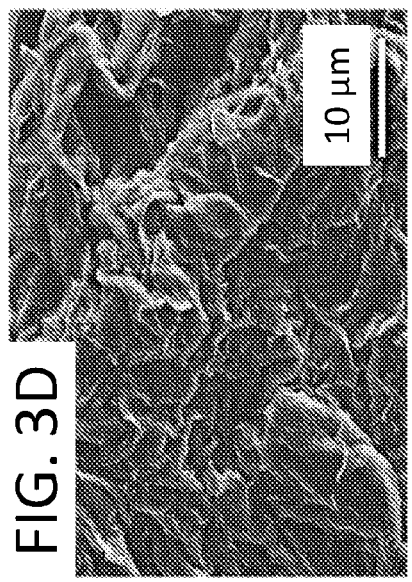
FIG. 3D
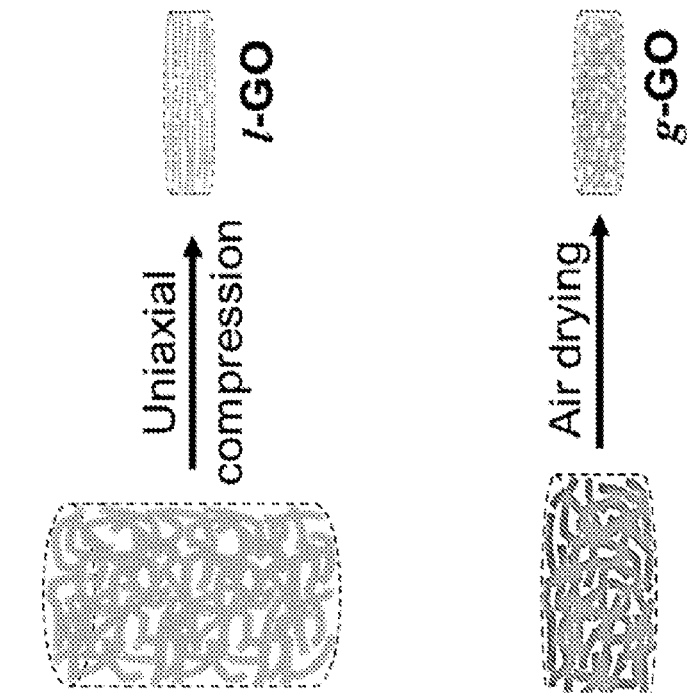
FIG. 3A
FIG. 3C

GRAPHENE OXIDE DOUGHS

CROSS-REFERENCE TO RELATED APPLICATIONS

This application is a National Stage of International Application No. PCT/US19/50927, filed Sep. 13, 2019, which claims the benefit of U.S. Provisional Patent Application No. 62/730,848, filed Sep. 13, 2018, the entire disclosures of which are herein incorporated by reference.

REFERENCE TO GOVERNMENT RIGHTS

This invention was made with government support under N000141612838 awarded by the Office of Naval Research. The government has certain rights in the invention.

BACKGROUND

Graphene oxide (GO), which can be obtained as an oxidative exfoliation product of graphite or grown, has gained significant interest as a building block to create graphene-based materials, including reduced graphene oxide, r-GO, because of its dispersibility in water and rich functionality. GO dispersions are usually used as starting materials to construct various graphene-based architectures through solution-processing routes. Direct fabrication of self-standing GO structures from dispersions or gels has been largely limited to thin films and lightweight foams. A dough is a highly cohesive, malleable, and viscoelastic state of matter that can be readily reshaped without fracture, which is very useful for making free-standing three-dimensional (3D) structures. However, a dough state of GO has not yet been achieved. Although evaporation can remove water from dilute GO solutions, GO's tendency to go to the air-water surface, hinders the evaporation process due to its barrier properties. On the other hand, adding small amounts of water to dried GO solids is also an unfeasible route to GO dough formation because small aliquots of water tend to be absorbed locally, leading to non-uniform hydration.

SUMMARY

GO doughs are provided. Also provided are glassy GO solids, glassy graphene solids made from the doughs, and methods of making the doughs and the solids.

One embodiment of a dough composition includes GO sheets in water, wherein the concentration of GO sheets is in the range from 20 weight percent (wt. %) to 60 wt. %, based on the total weight of the GO sheets and the water, and the composition is free of polymers, polymer precursors, and chemicals that act to increase the dispersibility of the GO sheets in water.

One embodiment of a glassy GO solid includes: GO sheets arranged in a non-lamellar arrangement, and optionally, water, wherein the concentration of GO sheets is greater than 60 wt. %, based on the total weight of the GO sheets and any water that is present, and the glassy GO solid is free of polymers, polymer precursors, and chemicals that act to increase the dispersibility of the GO sheets in water.

One embodiment of a glassy graphene solid includes: r-GO sheets arranged in a non-lamellar arrangement, and optionally, water, wherein the concentration of r-GO sheets is greater than 60 wt. %, based on the total weight of the r-GO sheets and any water that is present, and the glassy graphene solid is free of polymers, polymer precursors, and chemicals that act to increase the dispersibility of the reduced GO sheets in water.

One embodiment of a method of making a dough includes the steps of: forming an aqueous dispersion comprising GO sheets dispersed in water, the aqueous dispersion having a GO sheet concentration of no greater than 2 wt. %, wherein the aqueous dispersion is free of polymers, polymer precursors, and chemicals that act to increase the dispersibility of the GO sheets in water; freeze drying the aqueous dispersion to form a GO foam; partially rehydrating the GO foam by exposing it to a water mist to form a composition in which the concentration of GO sheets is in the range from 20 wt. % to 60 wt. %, based on the total weight of the GO sheets and the water; and mechanically manipulating the composition.

One embodiment of a method of making a glassy GO solid includes the steps of: forming an aqueous dispersion comprising GO sheets dispersed in water, the aqueous dispersion having a GO sheet concentration of no greater than 2 wt. %, wherein the aqueous dispersion is free of polymers, polymer precursors, and chemicals that act to increase the dispersibility of the GO sheets in water; freeze drying the aqueous dispersion to form a GO foam; partially rehydrating the GO foam by exposing it to a water mist to form a composition in which the concentration of GO sheets is in the range from 20 wt. % to 60 wt. %, based on the total weight of the GO sheets and the water; mechanically manipulating the composition; and drying the composition.

One embodiment of a method of making a glassy graphene solid includes: forming an aqueous dispersion comprising GO sheets dispersed in water, the aqueous dispersion having a GO sheet concentration of no greater than 2 wt. %, wherein the aqueous dispersion is free of polymers, polymer precursors, and chemicals that act to increase the dispersibility of the GO sheets in water; freeze drying the aqueous dispersion to form a GO foam; partially rehydrating the GO foam by exposing it to a water mist to form a composition in which the concentration of GO sheets is in the range from 20 wt. % to 60 wt. %, based on the total weight of the GO sheets and the water; mechanically manipulating the partially rehydrated composition; reducing GO sheets in the composition to form r-GO sheets; optionally, removing water from the composition; and hot pressing the composition.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIGS. 3A-3F depict a glassy GO solid with enhanced and isotropic mechanical properties. FIGS. 3A-3B show that uniaxial compression turns a freeze-dried GO foam to a GO pellet with lamellar microstructure, which is denoted as l-GO. FIGS. 3C-3D show that a glassy GO pellet made of disorderly packed sheets, denoted as g-GO, is made by first gently molding the dough into a pellet by hand, followed by drying in air. FIG. 3E shows XRD patterns of the two types of GO pellets. FIG. 3F shows nanoindentation curves of the two types of GO pellets. The g-GO pellet does not have a strong diffraction peak corresponding to lamellar ordering, and it exhibits largely isotropic properties and higher hardness. Scale bars in are 10 μm.

FIGS. 4A and 4B show that the graphenic glass is composed of more defective graphene sheets.

DETAILED DESCRIPTION

Figure 1B:
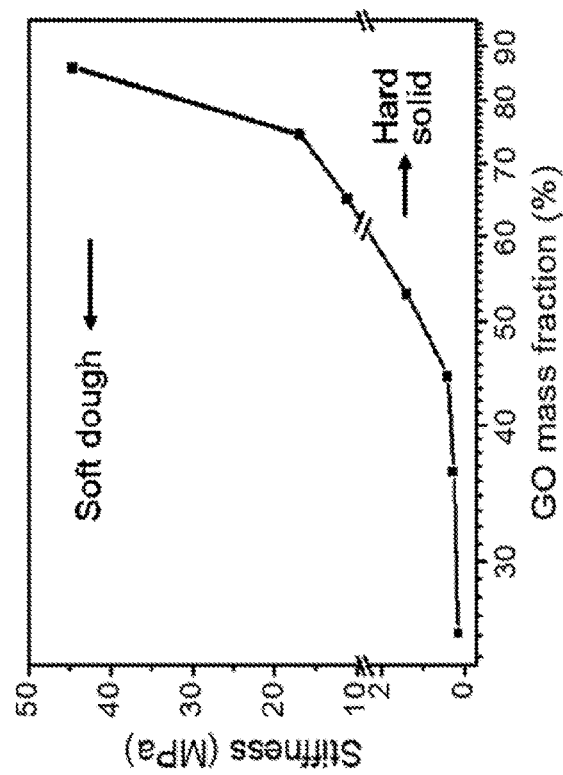
FIG. 1B shows that a dough-state GO is obtained when the mass fraction of GO exceeds 20 wt. %. GO dough is highly malleable until its mass fraction is increased to over 60 wt. %, after which the stiffness increases significantly.

GO doughs are provided. Also provided are glassy GO solids, glassy graphene solids made from the doughs, and methods of making the doughs and the solids.

In the present methods, solution-based processing techniques are used to construct a continuum of various bulk forms of GO and other graphene-based materials from GO sheets. The continuum, which is achieved by increasing the GO:water ratio in the materials, includes materials that transition from a dilute aqueous dispersion, to a thick gel, to a new dough state with a GO loading of greater than twenty wt. % GO, and eventually, to a dense GO solid, as the water content is reduced.

Some embodiments of the compositions are free of binders that provide a matrix in which the GO particles are dispersed. For example, the compositions can be free of polymers, including polymer resins, and organic monomers and oligomers that react to form organic polymers. Molecules that react to form a polymer, such as monomers, oligomers, and crosslinkers, are referred to herein as polymer precursors. The compositions can also be free of additives, such as initiators (e.g., free radical initiators, such as peroxides, thermal initiators, e-beam initiators) and/or free of organic solvents, such as aniline and cresols. As used herein, the term initiator refers to a chemical moiety (e.g., a molecule) that induces the polymerization of polymer precursors. In addition, the compositions can be free of any chemicals that act to increase the dispersibility of the GO in water, including surfactant molecules and/or dispersants and/or free of any additives that underdo electrostatic interactions with the GO sheets inducing aggregation and assembly of the sheets. This includes embodiments of the compositions that contain only the GO and water. However, these compositions may contain other components, including components that are present as impurities in the starting materials. Generally, these impurities, if present, are present at very small concentrations. By way of illustration, in various embodiments of the compositions, the GO particles and water make up at least 99 wt. % of the composition, including embodiments in which the GO particles and water make up at least at least 99.8 wt. % of the composition, embodiments in which the GO particles and water make up at least at least 99.9 wt. % of the composition, embodiments in which the GO particles and water make up at least at least 99.98 wt. % of the composition, and embodiments in which the GO particles and water make up 100 wt. % of the composition.

Low viscosity, aqueous liquid dispersions of the GO can be formed by using relatively low concentrations of the GO particles. Typical GO particle concentrations in the low viscosity, aqueous dispersions are less than two wt. %, including GO particle concentrations of less than 1 wt. %, less than 0.5 wt. % and less than 0.1 wt. %. The aqueous dispersions can be converted into the denser forms of the graphene-based materials by freeze-drying the dispersions into porous GO foams, followed by a partial rehydration of the foams using a water mist to form a GO dough, where the term water mist refers to fine water droplets dispersed in (e.g., suspended in) air.

The doughs are highly malleable viscoelastic materials. For example, some embodiments of the GO doughs have a stiffness in the range from 0.1 MPa to 2 MPa. Typical GO particle concentrations in the doughs include concentrations in the range from about 20 wt. % up to about 60 wt. %. This includes doughs having a GO particle concentration in the range from 40 wt. % to 60 wt. %, in the range from 45 wt. % to 60 wt. %, and in the range from 50 wt. % to 60 wt. %.

The dough state is a highly versatile form of GO that is well-suited for manufacturing. The high mass loading and compact form factors of GO doughs make them economical to store and transport, and they can turn into high quality dispersions simply by adding water. Compared to dried GO powders or films, the doughs are sufficiently hydrated to avoid a spontaneous exothermal self-propagating reduction reaction, and they are much safer to handle.

Sheets of GO in a dough are crumpled and packed in a disorderly manner, rendering it cohesive and highly extensible, even without binders or other additives. The dough is malleable, highly processable and extensible and can be rolled, cut, molded, kneaded without leaving stains, readily reshaped, connected, and/or further processed to make bulk GO and other graphene materials into objects having a variety of shapes of arbitrary form factors and tunable microstructures. These objects are able to retain their shapes after drying. For example, the high GO particle content doughs can be used to fabricate pure GO particle coatings, devices, shaped objects, and flexible thin films. By way of illustration, embodiments of the doughs can be placed into or around a mold and molded into macroscopic 3D objects having shapes corresponding to that of the mold, including objects having length, width, and/or height dimensions of at least 1 mm, including one or more dimensions of at least 1 cm. Such components include, for example, electronic components or mechanical parts.

The GO doughs can be used to form composite doughs that include the GO particles and other types of inorganic particles, including other carbon nanoparticles, such as carbon nanotubes. These composite doughs can be made by dispersing carbon nanotube powders into a GO dispersion; freeze drying the resulting co-dispersion to form a composite foam that includes the GO particles and the carbon nanotubes; partially rehydrating the composite foam by exposing it to a water mist to form a composition; and mechanically manipulating the composition to form a dough state. The composite doughs can then be further dried to form solid objects.

The GO doughs can be transformed into a gel by further hydrating the material. The gel state of the GO-based material is much more viscous than the dispersion state—typically having a viscosity of greater than 1000 Pa·s at 298 K and a GO particle mass fraction greater than 5 wt. %. For example, various embodiments of the GO gels have a GO particle concentration in the range from 5 wt. % to less than 20 wt. %. The gels are free-standing materials that exhibit shear thinning behavior and can be extruded into self-supporting fibers, which maintain their shape after removing some or all of the water, to form stiff solid objects via 3D (i.e., extrusion) printing or protrusion.

Alternatively, the doughs can be transformed to a dry and dense "glassy" GO solid or to a graphene solid without long-range stacking order of the sheets by mechanically manipulating (e.g., by kneading or rolling) and drying the doughs via, for example, air drying or vacuum drying. (As used herein, mechanically manipulating refers to a process of applying a shape-changing force to the dough that has the effect of disrupting the stacked arrangement of the GO sheets in the dough.) By way of illustration, various embodiments of the glassy GO solids have densities in the range from about 1.3 to about 1.7 g/cm$^3$. Because they are formed from doughs in which the GO sheets have a non-lamellar microstructure, the GO sheets in the solids also have a non-lamellar microstructure with isotropically packed GO sheets. The GO sheets in the glassy GO solids are crumpled and interlocked, leading to isotropic properties and higher hardness. As a result, the glassy GO solids exhibit isotropic and enhanced mechanical properties due to hindered sliding between the sheets. As illustrated in the Example, the non-lamellar GO sheet microstructure is evidenced by a higher hardness and a hardness that does not exhibit a significant orientational dependence, relative to a GO material having a lamellar GO sheet microstructure. By way of illustration, some embodiments of the GO glasses have a top hardness that differs from their side hardness by no greater than 15%. Hardness can be measured by indentation tests carried out on a top surface and a side surface, where the top surface and the side surface are separated by 90°, as illustrated in the Example. In addition, the non-lamellar GO sheet microstructure can be demonstrated by lack of a strong diffraction peak that is characteristic lamellar ordering in an XRD spectrum of the material, as illustrated in the Example. The existence of a non-lamellar GO sheet microstructure can be determined by a comparison with the XRD pattern of a freeze-dried GO foam made and characterized in accordance with the methods reported in the Example. A GO dough (or a glassy solid made therefrom) can be considered to have a non-lamellar GO sheet microstructure if its peak at 11° in an XRD pattern is at least ten times lower than the same peak in the XRD pattern of a freeze-dried GO foam (FIG. 3B) made and characterized in accordance with the methods reported in the Example. Some embodiments of the GO doughs having a non-lamellar GO sheet microstructure have a peak at 11° in an XRD pattern that is at least 50 times lower, or even at least 100 times lower, than the same peak in the XRD pattern of a freeze-dried GO foam made and characterized in accordance with the methods reported in the Example. This comparison is illustrated in the comparison of the two XRD peaks shown in FIG. 3E.

A GO dough also can be transformed into a glassy graphene solid (also referred to as graphenic glass) that also exhibit isotropic properties by at least partially reducing the GO sheets in the dough, followed by drying and hot pressing. The hot pressing can take place at a temperature of, for example, 600° C. or higher, including 700° C. or higher (e.g., 750° C. to 850° C.). Hot pressing can take place at a pressure of, for example, no higher than 50 MPa, including a pressure of 40 MPa to 50 MPa. Suitable hot-pressing times include, but are not limited to, periods of at least 2 minutes, at least 5 minutes, and at least 10 minutes (e.g., 2 to 20 minutes). The graphenic glass, although made of less graphitized r-GO sheets, can be even harder than commercial high strength graphite materials due to its microstructure limiting sheet sliding. By way of illustration, various embodiments of the graphenic glass have a density of at least 1.7 g/cm$^3$ and/or a Vickers hardness of at least 30 HV$_{300}$. This includes graphenic glasses having a Vickers hardness of at least 35 HV$_{300}$ and at least 40 HV$_{300}$.

Unless otherwise indicated, the measured or measurable quantitative values recited herein that are temperature and/or pressure dependent refer to such values at room temperature (~23° C.) and atmospheric pressure.

Example

This example describes a continuum of GO-water mixtures, showing continuous transitions between four states, starting from a dilute dispersion and progressing to a thick gel, a malleable dough, and eventually to a dense solid as the water content decreases. This continuum finally completes the scope of GO-water mixtures with the long missing dough state, which typically has a mass fraction of GO around tens of weight percent. Doughs are found to be highly processable, can be shaped by common processing methods, and exhibit super extensibility, as described in Lu, L., et al. (*Science* 287, 1463-1466 (2000).) This binder-free dough state of GO is a versatile material platform to fabricate bulk GO and graphene architectures with arbitrary shapes and tunable microstructures, including porosity and sheet alignment.

Results

GO-Water Continuum.

A system consisting of GO and water was prepared along a continuum of increasing concentration of GO, transitioning between four states, starting with a dilute dispersion and progressing to a thick gel, a malleable dough, and a dense solid. GO was synthesized by a modified Hummer's method. Powders of GO were obtained in the form of a filter cake after filtering a dispersion of purified sheets and drying in vacuum. Dilute dispersions (<2 wt. %) were typically made by dispersing small pieces of dried GO filter cake in water.

Figure 5:
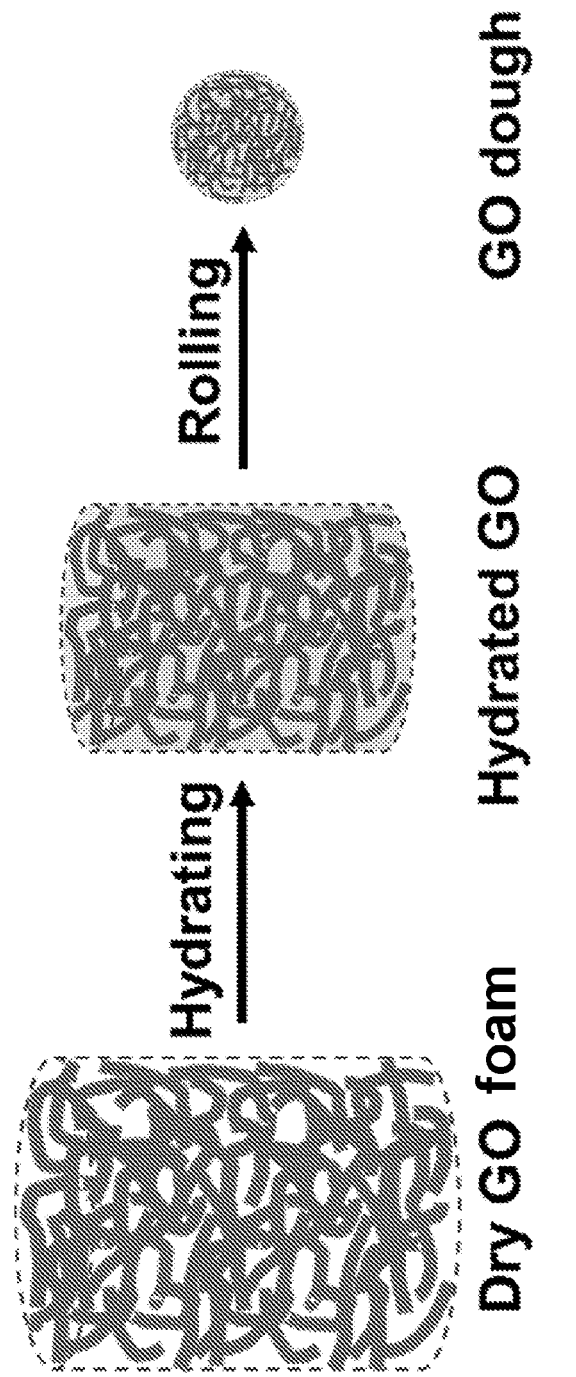
FIG. 5 depicts the preparation of GO doughs. Schematic diagrams show that GO doughs were obtained by hydrating dry GO foams with aerosolized water mist. After hydration, the GO foams collapsed and turned into hydrated GO, which can then be kneaded and rolled into a GO dough.

Direct preparation of higher-concentration dispersions from dried GO was difficult since the apparent volume of GO powders was already comparable or higher than the volume of water needed. Therefore, adding a small aliquot of water usually resulted in local, non-uniform hydration of GO powders. In order to obtain uniform GO-water mixtures with very high GO loadings, aerosolized water mists were applied to GO foams obtained by freeze-drying, which collapsed upon water uptake. This process allowed uniform hydration of GO by a minute amount of water throughout the entire volume of the material, which had been difficult by other means. Further kneading and rolling of the collapsed foam turned the material into a dough state (FIG. 5). The dough state of GO can serve as a precursor to make high-concentration gels by dilution, or denser solids by drying.

Figure 1A:
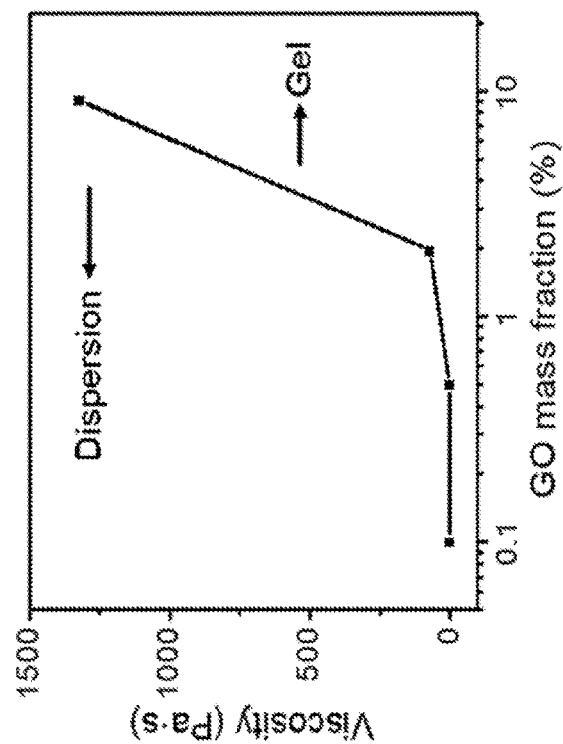
FIG. 1A shows the transition from a dilute dispersion to a gel characterized by a drastic increase in viscosity.

Transitions between the four states were accompanied by significant changes in their rheological and mechanical properties. As the mass fraction of GO was increased, the dilute dispersion turned into a thick non-flowing gel. Accordingly, a significant increase in viscosity was observed when the GO mass fraction exceeded 2 wt. % (FIG. 1A). Increasing the GO fraction to over 20 wt. % resulted in a new viscoelastic dough state. Unlike the thick gels, the dough state could be kneaded and rolled on a surface without leaving extensive stains. This dough state could be easily deformed without fracture and dried to form a dense GO solid that retained the shape. The dough state remained highly cohesive and processable until the mass fraction reached about 60 wt. %, after which the mixture became significantly stiffer, as characterized by a rapid increase of its compression modulus (FIG. 1B). As the loading of GO exceeded 60 wt. %, the solid became fragile and tended to fracture after compression.

Figure 6:
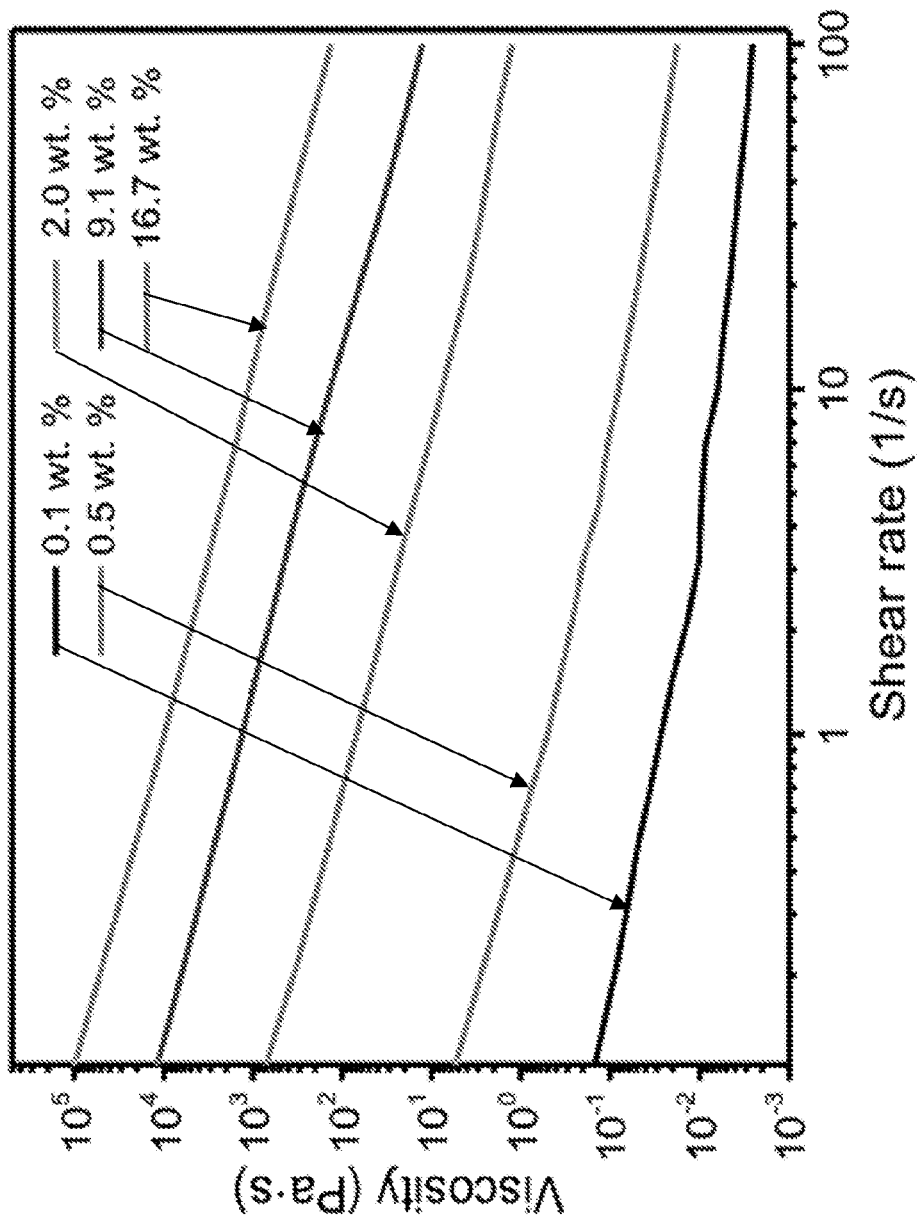
FIG. 6 shows the rheological properties of the GO-water dispersions and gels. The evolution of viscosity against shear rate for the GO-water at various GO mass fractions are depicted, showing that they are shear thinning and that their viscosities can be tuned over a wide range of values.

Results of viscosity measurements of the GO-water mixtures, including dispersions and gels, are shown in FIG. 6, showing shear thinning behaviors that can be attributed to shear alignment of sheets and reduced tangling at higher shear rates. Making the gel from the dough state was much more straightforward than other methods, and the rheological properties of the gels could be tuned over a large range by simply adjusting the volume of water added. This allowed customization of GO gels for a broad array of materials-processing techniques to create GO and graphene final products.

Binder-Free GO Dough—a Compact Form for Storage and Transportation.

The dough state is a highly versatile form of GO that is ideal for manufacturing. The high mass loading and compact form factors of GO doughs make them economical to store and transport. And since GO doughs can be prepared free of binders or cross-linkers, they can be readily and repeatedly re-dispersed in water to re-generate high quality GO dispersion. SEM and AFM images revealed that the as-made GO sheets had lateral dimension of around 5 µm to 20 µm and thicknesses of about 1 nm. The dispersion was freeze-dried to yield a foam, which was subsequently hydrated and kneaded to obtain the dough state. The dough was then placed in water, gently stirred for around 10 mins, and sonicated in a table-top sonicator for 2 mins, which resulted in a dispersion with similar color and stability as the starting dispersion. The GO sheets in films spin coated from the final dispersion were found to have similar lateral dimension, thicknesses, and morphologies as those of starting GO sheets. These results demonstrate that converting GO dispersion into the much more compact dough state did not deteriorate the quality of GO sheets in terms of sizes and colloidal processability. Compared to other compact forms, such as dried powders or films, GO doughs are sufficiently hydrated to avoid spontaneous exothermal self-propagating reduction reaction, and much safer to handle. GO doughs are also cleaner to handle than gels or pastes, due to their high cohesivity and non-staining properties.

Moldability and Extensibility of GO Dough.

Figure 2A:
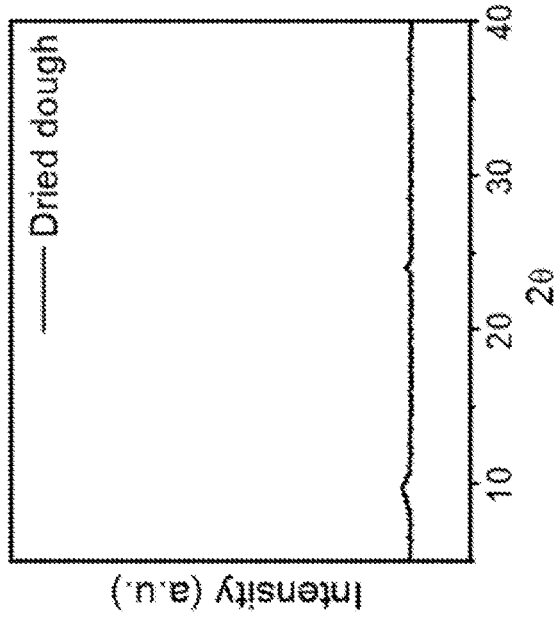
FIG. 2A is a cross-sectional scanning electron microscope (SEM) image of the dried solid that does not show lamellar microstructure.
Figure 2B:
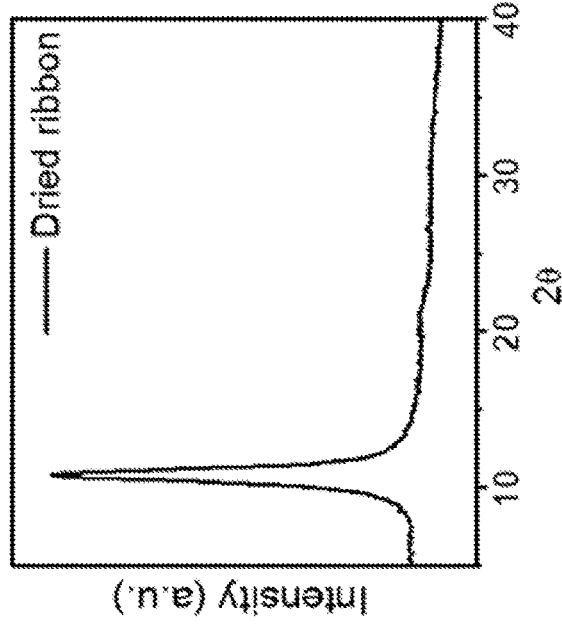
FIG. 2B shows that this is consistent with the lack of a strong diffraction peak in the X-ray diffraction (XRD) pattern of the air-dried GO solid.

The dough state of GO could be deformed into arbitrary form factors by common shaping methods, including cutting, shaping, molding, and carving. Pieces of GO doughs could be connected together simply by bringing them into contact followed by gentle compression. The versatility of GO dough allowed unusual shapes to be made with ease, which had been difficult to achieve by other means. As-made GO doughs isotropically shrunk upon air drying, yielding dense solids with disorderly packed sheets that were heavily wrinkled and crumpled (FIG. 2A). XRD patterning of the dried GO solid did not show an apparent peak around 11°, which is characteristic for lamellar GO structures with long-range stacking order of the sheets (FIG. 2B).

Figure 2D:
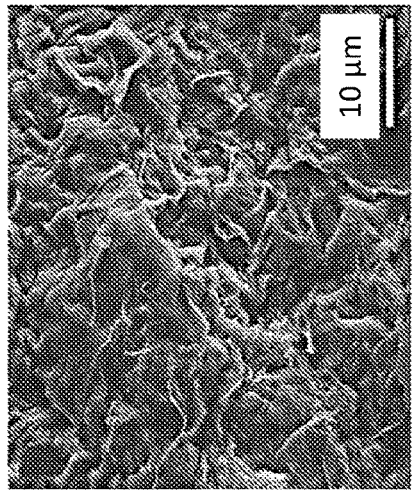
FIG. 2D is a cross-sectional SEM image of the dried ribbon that shows the development of the lamellar microstructure, which is consistent with the strong diffraction peak around 11° in the XRD pattern in FIG. 2E.
Figure 2E:
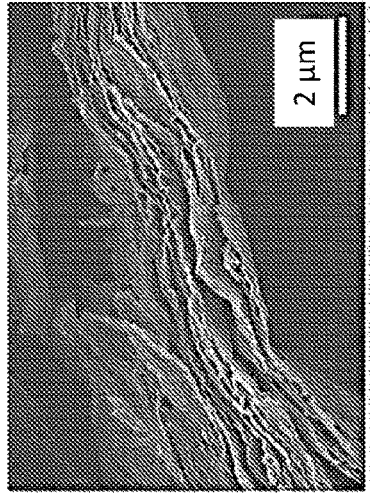
FIG. 2C shows that a short block of GO dough can be repeatedly cold rolled to a long GO ribbon with 10,500% of extension.
Figure 2C:
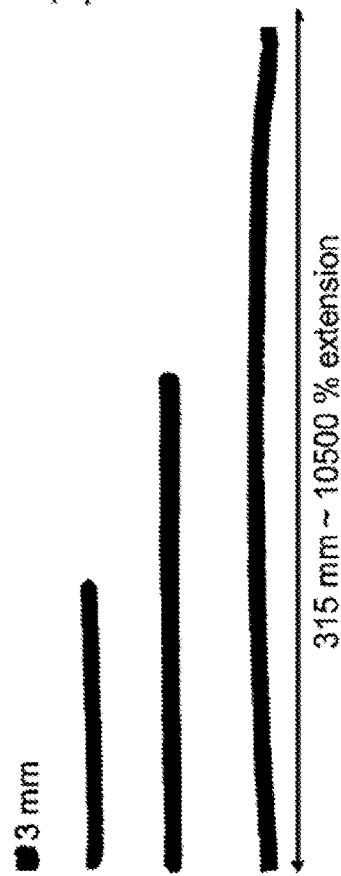

The GO dough sustained extreme deformation without fracture, exhibiting super extensibility. A proof-of-concept is shown in FIG. 2C, where a 3-mm-long GO block was transformed into a long ribbon by cold rolling with lateral constraint. Two additional rolling steps were performed to further increase the length to 315 mm, corresponding to an elongation of 10,500%. The extraordinary extensibility of the GO dough is attributed to both unfolding of the sheets and their sliding under shear. Indeed, the final cold-rolled ribbon has a lamellar microstructure (FIG. 2D). An XRD pattern of the dried ribbon shows a strong diffraction peak, corresponding to an interlayer spacing of 8.18 Å (FIG. 2E). Preparing thick GO films by vacuum filtration is quite tedious due to the barrier properties of the sheets that make the filtration process self-limiting. GO dough could thus serve as a more versatile starting material for creating large-area GO films by rolling with the thickness controllable by the gap between the rollers. Since GO doughs can be free of binders or cross-linkers, GO solids obtained from GO doughs are all reversible; i.e., they can be re-dispersed in water.

Figure 7B:
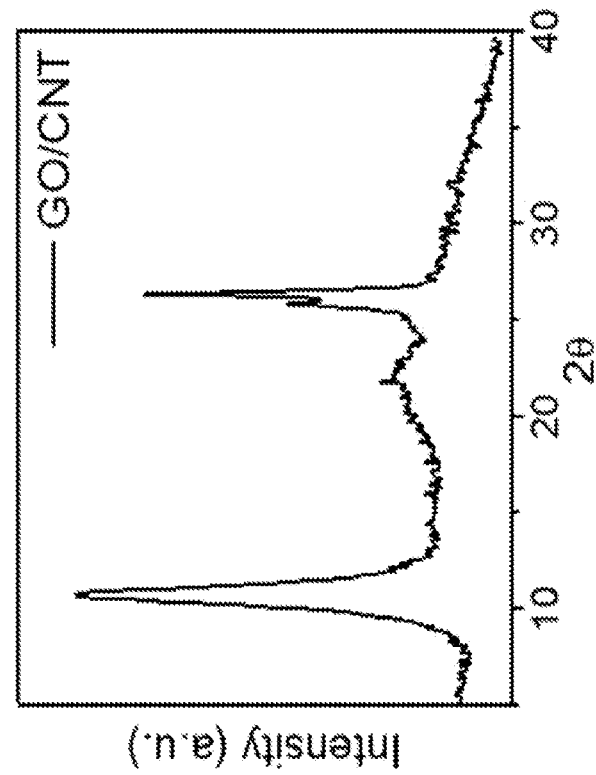
FIG. 7B depicts the XRD pattern, showing characteristic peaks of GO (around 11°) and SWCNT (around 26°).
Figure 7A:
FIG. 7A depicts a cross-sectional SEM image of the dried composite, showing single-walled carbon nanotubes (SWCNTs) sandwiched between GO layers.

The dough state of GO can be extended to a number of GO-based composites, leveraging GO's surfactant properties to incorporate other components. For example, SWCNTs can be readily dispersed in water in the presence of GO, which can then be converted into a GO/SWCNT composite dough following the same procedure. This GO/SWCNT composite dough is still highly cohesive and processable and can also be cold rolled into a free-standing membrane (FIG. 7A), enabling the preparation of composite doughs with various combinations of GO and functional materials based on the preparation methods described herein.

Figure 3F:
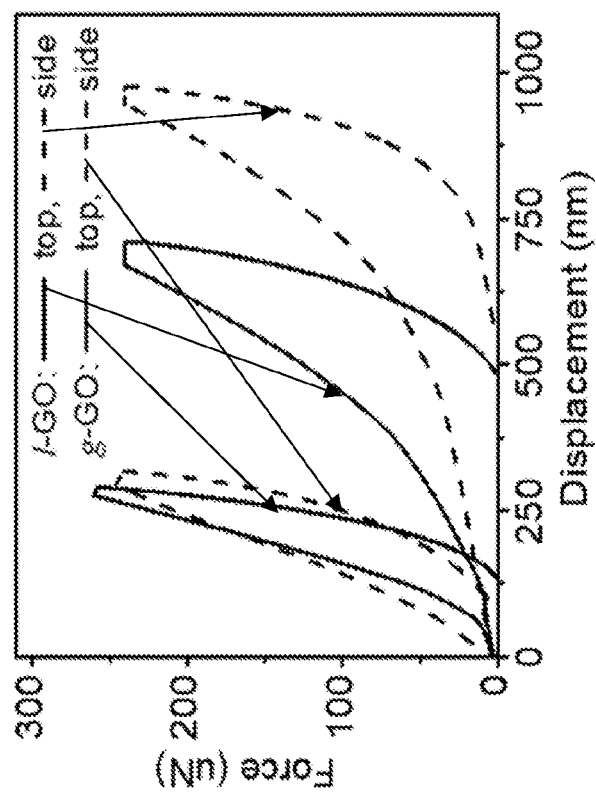
Figure 3E:
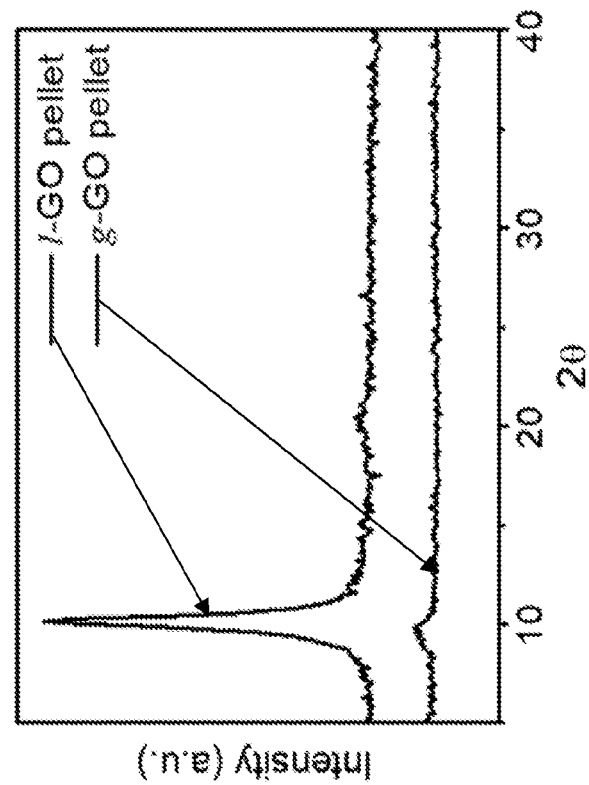

Glassy GO solids. The GO dough is a precursor to the preparation of a dense GO solid with unique isotropic microstructure and properties. Typically, GO structures exhibit lamellar microstructures with long-range stacking order of GO sheets, which leads to orientation-dependent properties. However, since the dough was obtained by a small degree of hydration of GO foam, followed by kneading, the sheets were not aligned. During drying, the dough experienced isotropic capillary compression and gradually densified by squeezing and deforming of the GO sheets. The final microstructure was made of densely packed, heavily deformed sheets without apparent long-range stacking order, which bore a strong resemblance to pistachio shells. (See, e.g., Movva, M., et al., *Materials Research Express* 4, 045014, (2017).) To study the effect of sheet alignment in the properties of dense GO solids, two bulk pellets with similar size, shape, and density, but with different types of microstructures were prepared. One pellet was made by compressing a freeze-dried GO foam at 200 MPa to induce alignment of the GO sheets (FIG. 3A). Such uniaxial compression indeed rendered the resulting pellet a lamellar microstructure (FIG. 3B) with a strong XRD peak corresponding to an interlayer spacing of 8.74 Å (FIG. 3E). The other pellet was made by gently molding a GO dough into the same shape, followed by drying in air (FIG. 3C). A cross-sectional SEM image of the dried pellet did not show any obvious lamellar ordering (FIG. 3D), consistent with the lack of a strong diffraction peak around 11° in the XRD pattern (FIG. 3E). Both types of pellets have similar measured densities of around 1.5-1.6 g/cm$^3$. The pellet with lamellar ordering is denoted as the l-GO pellet, while the one with disordered sheets is denoted as the glassy GO (g-GO) pellet.

Indentation tests were applied to study the mechanical properties of the two types of pellets at both their top and side surfaces. The corresponding force-displacement curves are shown in FIG. 3F. In the l-GO pellet, the sheets were aligned parallel to the top surface. Indentation on the side should have encountered smaller resistance because the load could have easily caused sliding, deformation, or even partial opening of the lamellar structure. Indentation along the top surface should have encountered higher resistance since the force was normal compared to the sliding direction of sheets. Indeed, the l-GO pellet was significantly softer on the side, with a measured hardness of 13.38±3.02 MPa, in comparison to 25.29±5.20 MPa measured on the top surface. In contrast to the anisotropic mechanical property of the l-GO pellet, the hardness of the g-GO pellet did not exhibit significant orientation dependence, with a hardness of 133.37±14.76 MPa measured on the top surface and 117.15±12.66 MPa on the side. Similar displacement values were obtained when indenting the g-GO pellet from both its top surface and side. The hardness of the g-GO pellet was drastically higher than that of the l-GO. This is because the g-GO pellet was made of entangled and heavily crumpled sheets, which hindered sliding, making it much more resistant to deformation. Taken together, these results show that GO solids of similar size, shape, and density can exhibit significantly different properties due to different sheet alignments. The GO dough is thus very suitable for creating bulk GO materials with isotropic properties.

Graphenic Glass.

Figure 4B:
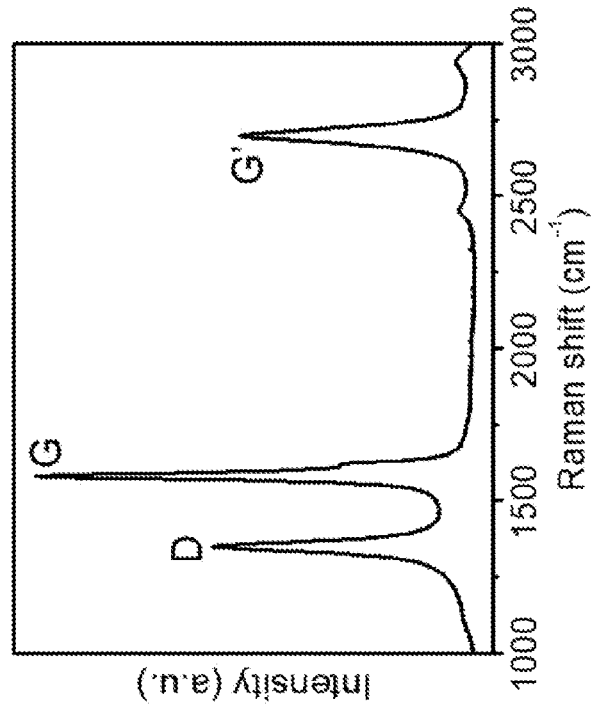
FIG. 4B depicts a Raman spectrum of an isotropic graphite.
Figure 4A:
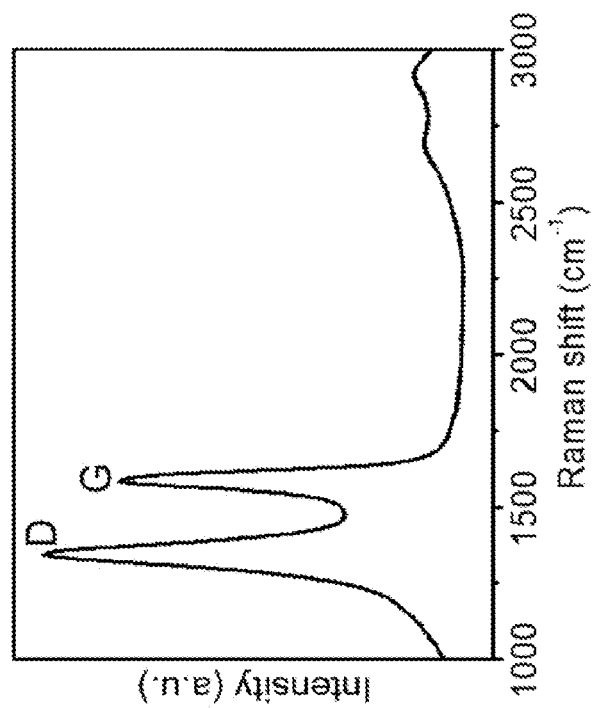
FIG. 4A depicts a Raman spectrum of a graphenic glass.
Figure 4D:
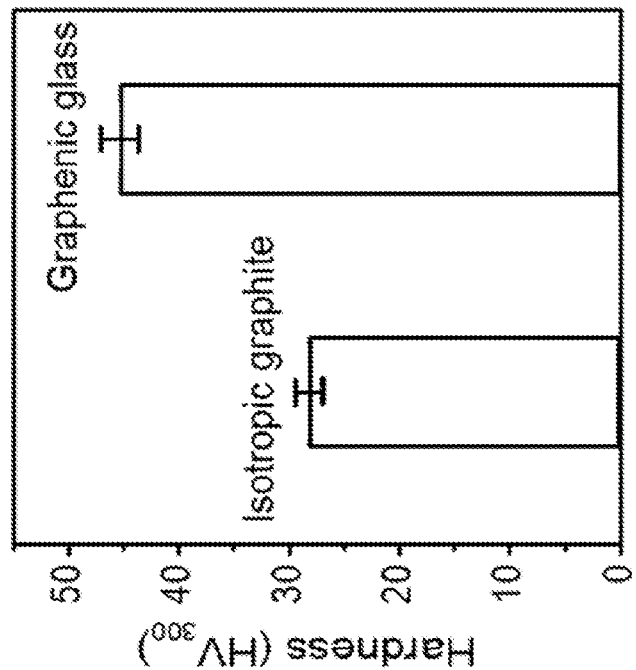
FIG. 4D depicts a Vickers hardness test showing that the graphenic glass is harder than the isotropic graphite.
Figure 4C:
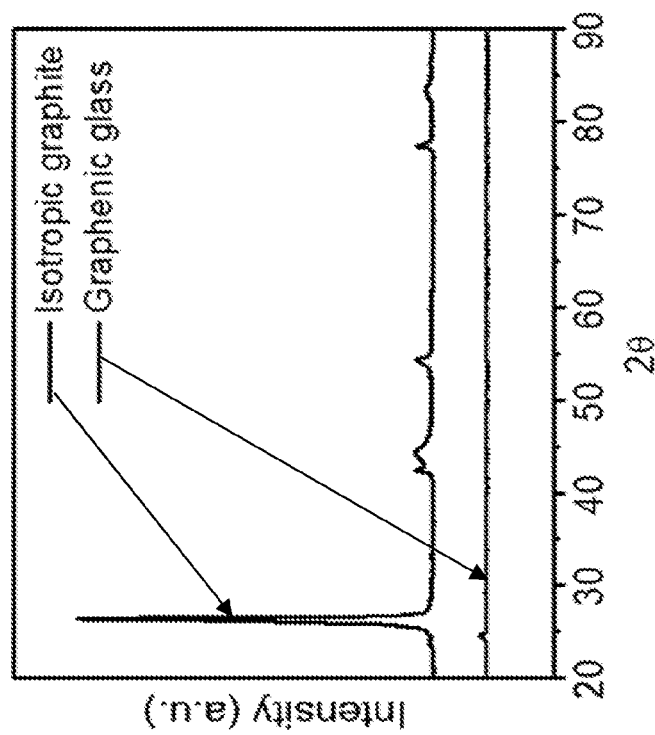
FIG. 4C depicts XRD patterns showing that the isotropic graphite is made of highly crystalline graphite grains, while the graphenic glass, at similar density, does not have obvious long-range stacking order of the sheets.

Since the dough state makes isotropic glassy GO solids readily accessible, it should also lead to glassy graphene solids after reducing GO. In such solids, the graphene sheets are densely but disorderly packed, exhibiting weak long-range stacking order. Therefore, they are named graphenic glass, taking inspiration from bulk metallic glass. (See, e.g., Miller, M., et al., Springer Science & Business Media, 2007).) To prepare such a glassy graphene solid, a GO dough (c.a., 50 wt. %) was first molded into a cylindrical shape and then reduced by HI vapor, followed by washing with ethanol. The dried solid was further hot pressed under 50 MPa at 800° C. to a final density of 1.71 g/cm$^3$. An XRD pattern of the resulting graphenic solid only showed a very weak diffraction peak around 26°, indicating the stacking of graphene sheets was rather disordered (FIG. 4C).

Figure 4F:
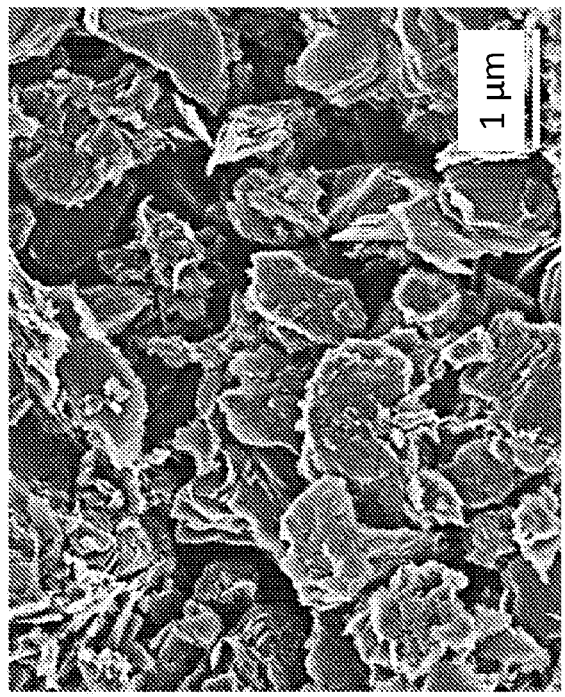
FIG. 4F shows that, in contrast, the isotropic graphite has a much rougher and more granular microstructure, with much larger voids.
Figure 4E:
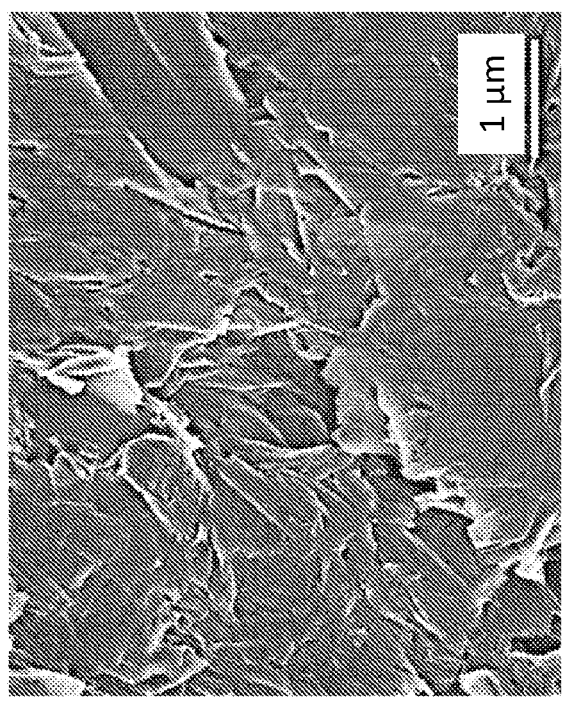
FIG. 4E shows that this can be attributed to its smoother microstructure with finely distributed free volume (i.e., voids).

As is with glassy GO, sheet sliding is also significantly hindered in graphenic glasses, which should make them harder than their lamellar counterpart. For comparison, a commercially available high strength graphite rod with a similar density of 1.78 g/cm$^3$ was selected as a control sample. Such bulk graphite materials are typically made by isostatically densifying fine graphite powders with a binder, followed by calcination at elevated temperatures (e.g., 2500-3000° C.), and have widespread applications in areas including the semiconductor industry and nuclear reactors. Although the graphite grains still have anisotropic properties, the bulk solid is considered isotropic due to the averaging effect of randomly oriented graphite grains. The isotropic graphite cylinder sample used in this Example had relatively fine grains around 5 µm and was known for its comparatively high strength and hardness, making it suitable for making die sets for hot-pressing applications. In contrast, the glassy graphene solid was made of much weaker and less graphitized r-GO sheets. Indeed, Raman spectra (FIGS. 4A and 4B) showed that the r-GO sheets in the glassy graphene solid were a lot more defective (with an ID/IG ratio of 1.21) than those in the bulk graphite sample (with an ID/IG ratio of 0.61) (FIGS. 4A and 4B). Since the two samples had similar densities, and the isotropic graphite was much more graphitized and made of harder grains, one would expect the isotropic graphite to be harder than the graphenic glass. However, Vickers hardness tests showed that the graphenic glass (with a hardness of 45.14±1.84 HV$_{300}$) was actually harder than the isotropic graphite (with a hardness of 28.01±1.29 HV$_{300}$) (FIG. 4D). SEM images taken on their polished surfaces revealed drastically different microstructures. The graphenic glass had a relatively smooth texture, while the isotropic graphite showed a much rougher and more granular microstructure with visible voids (FIGS. 4E and 4F). Since the two samples had similar densities, they should have had comparable levels of free volume. Therefore, the smoother microstructure of the glassy graphene suggested that its free volume was more finely divided and more uniformly distributed throughout the material. The higher hardness of the glassy graphene could be attributed to the finely distributed free volume and entangled network of the sheets within the solid, which gave it a higher resistance to plastic deformation. In contrast, although the isotropic graphite had harder grains, it also had more segregated free volumes (i.e., voids), which could not hinder sliding of the graphite grains, leading to lower hardness.

Methods

Preparation of GO Dispersions.

GO was synthesized using a modified Hummers method with a two-step purification process as reported earlier. (See, e.g., Hummers, W. S., et al., *J. Am. Chem. Soc.* 80, 1339-1339, (1958); Kim, F., et al., *Adv. Funct. Mater.* 20, 2867-2873, (2010); and Luo, J., et al., *Acc. Chem. Res.* 46, 2225-2234, (2013).) In a typical reaction, 6 g of graphite (Asbury, #2139), 5 g of K$_2$S$_2$O$_8$, 5 g of P205, and 25 mL of H$_2$SO$_4$ were stirred together at 80±5° C. Next, the dispersion was diluted and filtered with filter papers (Whatman, Grade No. 3). The pre-treated graphite powders were then collected and dispersed in 230 mL of H$_2$SO$_4$. After that, 30 g of KMnO$_4$ was slowly added. The mixture was kept at 35±5° C. for 2 hours and then slowly diluted with 0.5 L of DI water, followed by the addition of 30 mL of 30% H$_2$O$_2$. In the purification process, the mixture was first filtered using PTFE membrane (Millipore) and rinsed with 3.4% HCl solution. After drying in vacuum, the as-prepared GO was re-dispersed and washed in acetone, and eventually filtered and dried again to yield GO cakes. The as-received GO cakes can be readily dispersed in water by shaking, which can be accelerated by gentle sonication (e.g., a few minutes in a tabletop sonicator). Solid chemicals were purchased from Sigma-Aldrich, and liquid chemicals were purchased from Fisher Chemical. All chemicals were used as received.

Preparation of Freeze-Dried GO Foams.

In a typical freeze-drying procedure, 10 mL of GO dispersions at a concentration of 5 mg/mL were prepared in glass vials. Such GO dispersions were then immersed in a liquid nitrogen bath to freeze for 10 minutes. After GO dispersions were frozen, the vials were then transferred to a freeze-dryer, and porous and spongy GO foams were formed after the ice in frozen GO dispersions was completely sublimated (typically in 1-2 days).

Preparation of GO Doughs.

GO doughs were obtained by partially hydrating freeze-dried GO foams using water mist from an aerosol generator. Rolling the hydrated GO foams yielded GO doughs with GO mass fractions generally between 40-60 wt. %. The degree of hydration can be further tuned by adjusting the amount of additional water added in the GO doughs.

From GO Doughs to Gels.

Further hydrating the GO dough turned it into a sticky and gel-like material, which could be directly extruded via a syringe. The viscosity of the gel could be tuned at ease by adjusting the amount of water added into the dough.

Glassy GO Solids.

GO doughs were molded into arbitrary shapes such as a heart, a ball, and a pellet. Freeze-drying preserved their size and shape, leading to high-density foams. Air drying or vacuum drying the GO doughs resulted in dense GO solids with isotropically packed sheets that also became crumpled. Such solids are named glassy GO solids due to a lack of long-range stacking order reflected in their XRD patterns.

Preparation of Lamellar and Glassy GO Pellets.

High-density lamellar GO pellets were prepared by directly compressing freeze-dried GO foams in a stainless steel die at a pressure of 200 MPa. Glassy GO pellets were prepared from GO doughs, which were first molded into pellets by gently pressing them in a Teflon die by hand, followed by drying in air. The two pellets were fractured in order to study their mechanical properties perpendicular to the top surface of the pellets.

Graphenic Glass.

GO doughs with mass loading over 50 wt. % were reduced using hydroiodic acid vapor. (See, e.g., Pei, S. et al., *Carbon* 48, 4466-4474, (2010).) GO doughs were put in a glass petri dish, and the petri dish was placed in a sealed beaker containing 1 mL of HI solution, which was then heated to around 60° C. for 2 days. The reduction process yielded r-GO solids with volume shrinkage. The r-GO solids were then washed with ethanol, after which they were loaded in a graphite die and hot pressed at 800° C. under a pressure of 50 MPa for 10 minutes. The heating rate was 5° C./min.

Isotropic Graphite.

Based on a survey of disclosed isotropic graphite properties, two isotropic graphite rods with higher strengths and hardnesses were purchased from MERSEN USA Greenville-MI Corp. and McMaster-Carr for hardness measurement. The sample from MERSEN USA Greenville-MI Corp. was measured to have a higher hardness and was chosen as a control sample.

Characterization.

Elemental analysis of the as-made GO was done by combustion elemental analysis (Atlantic Microlab, Norcross, GA), and the weight percentage of C, H, Cl, and S were found to be 42.58%, 2.50%, 0.84%, and 3.68%, respectively. SEM images were obtained by field emission scanning electron microscopy (NOVA NanoSEM 600 and Hitachi SU8300). AFM images were acquired with a Park Systems XE-100 AFM under tapping mode. The XRD patterns were collected with a Rigaku Dmax powder diffractometer with Cu Kα radiation ($\lambda$=1.5418 Å) at 40 kV. Static mechanical uniaxial compressive tests were conducted with a dynamic mechanical analyzer (EltroForce 5500, BOSE). Rheological characterization was performed on a rheometer (Anton Paar, MCR 302) using a stainless-steel cone-and-plate geometry at room temperature. Hardness was obtained via nanoindentation (Hysitron TI 950 Triboindenter) using a standard three-sided pyramidal Berkovich probe with contact areas of around 1-20 $\mu m^2$. Since the grains of commercial isotropic graphite were bigger than the nanoindentation tip, hardness was measured using Vickers hardness tests on a Duramin 5 (Struers) microhardness tester equipped with a square-based pyramidal diamond indenter. An indentation load of 300 gf and a holding time of 10 s were applied with contact areas of around 6000-12000 $\mu m^2$. Raman spectroscopy was performed with a laser beam wavelength of 532 nm (Acton TriVista CRS System).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A malleable dough comprising graphene oxide sheets dispersed in water, wherein a concentration of the graphene oxide sheets is in a range from 50 weight percent to 60 weight percent, based on a total weight of the graphene oxide sheets and the water, and the dough is free of polymers, polymer precursors, and chemicals that act to increase dispersibility of the graphene oxide sheets in the water.

2. A malleable dough comprising graphene oxide sheets dispersed in water, wherein a concentration of the graphene oxide sheets is in a range from 20 weight percent to 60 weight percent, based on a total weight of the graphene oxide sheets and the water, and the dough is free of polymers, polymer precursors, and chemicals that act to increase dispersibility of the graphene oxide sheets in the water, the dough having a stiffness in a range from 0.1 MPa to 1 MPa.

3. A malleable dough comprising graphene oxide sheets and carbon nanotubes dispersed in water, wherein a concentration of the graphene oxide sheets is in a range from 20 weight percent to 60 weight percent, based on a total weight of the graphene oxide sheets and the water, and the dough is free of polymers, polymer precursors, and chemicals that act to increase dispersibility of the graphene oxide sheets in the water.

4. A malleable dough comprising graphene oxide sheets dispersed in water, wherein a concentration of the graphene oxide sheets is in a range from 20 weight percent to 60 weight percent, based on a total weight of the graphene oxide sheets and the water, and the dough is free of polymers, polymer precursors, and chemicals that act to increase dispersibility of the graphene oxide sheets in the water, and further wherein at least 99 weight percent of the dough consists of only the graphene oxide sheets and the water.

5. The dough of claim 4, wherein at least 99.8 weight percent of the dough consists of only the graphene oxide sheets and the water.

6. A glassy graphene oxide solid comprising:
graphene oxide sheets arranged in a non-lamellar arrangement; and
optionally, water;
wherein a concentration of the graphene oxide sheets is greater than 60 weight percent, based on a total weight of the graphene oxide sheets and any water that is present, and the glassy graphene oxide solid is free of polymers, polymer precursors, and chemicals that act to increase dispersibility of the graphene oxide sheets in the water.

7. The glassy graphene oxide solid of claim 6 having an edge hardness, as measured by nanoindentation, that differs from a top hardness, as measured by nanoindentation, by no more than 15%.

8. The glassy graphene oxide of claim 6, wherein at least 99 weight percent of the glassy graphene oxide consists of only the graphene oxide sheets and any water that is present.

* * * * *